(12) United States Patent
Koga et al.

(10) Patent No.: US 7,518,087 B2
(45) Date of Patent: Apr. 14, 2009

(54) LASER PROCESSING APPARATUS AND LASER PROCESSING METHOD

(75) Inventors: Norihisa Koga, Kikuchi-gun (JP); Shinji Koga, Kikuchi-gun (JP); Naoto Yoshitaka, Kikuchi-gun (JP); Akira Nishiya, Kikuchi-gun (JP)

(73) Assignee: Tokyo Electron Limited, Tokyo (JP)

( * ) Notice: Subject to any disclaimer, the term of this patent is extended or adjusted under 35 U.S.C. 154(b) by 463 days.

(21) Appl. No.: 11/252,630

(22) Filed: Oct. 19, 2005

(65) Prior Publication Data
US 2006/0086459 A1   Apr. 27, 2006

(30) Foreign Application Priority Data
Oct. 26, 2004   (JP)   ............... 2004-310749

(51) Int. Cl.
B23K 26/06   (2006.01)
B23K 26/38   (2006.01)
G06F 19/00   (2006.01)

(52) U.S. Cl. ............... 219/121.73; 219/121.7; 700/166

(58) Field of Classification Search ............... 219/121.7, 219/121.71, 121.73; 700/166
See application file for complete search history.

(56) References Cited

U.S. PATENT DOCUMENTS

| | | | | |
|---|---|---|---|---|
| 5,739,502 A | * | 4/1998 | Anderson et al. | 219/121.71 |
| 6,144,011 A | * | 11/2000 | Moss et al. | 219/121.69 |
| 6,329,632 B1 | * | 12/2001 | Fournier et al. | 219/121.7 |
| 6,380,512 B1 | * | 4/2002 | Emer | 219/121.71 |
| 6,720,522 B2 | * | 4/2004 | Ikegami et al. | 219/121.69 |

FOREIGN PATENT DOCUMENTS

| | | | |
|---|---|---|---|
| JP | 5-107729 A | * | 4/1993 |
| JP | 9-244223 A | * | 9/1997 |
| JP | 2000-196957 A | * | 7/2000 |
| JP | 2002-224878 | | 8/2002 |
| JP | 2003-249427 | | 9/2003 |

* cited by examiner

Primary Examiner—Geoffrey S Evans
(74) Attorney, Agent, or Firm—Oblon, Spivak, McClelland, Maier & Neustadt, P.C.

(57) ABSTRACT

A laser processing apparatus comprises a laser source, a substrate-holding unit, a liquid-supplying unit, a support which has a plurality of mask patterns including a specific mask pattern for imparting a cross-sectional shape to the laser beam, and a support-driving mechanism which moves the support. The liquid-supplying unit supplies the liquid to the substrate, forming a liquid film thereon. The support-driving mechanism moves the support, aligning the specific mask pattern with an axis of the laser beam. The laser beam emitted from the laser unit passes through the specific mask pattern, acquiring a specific cross-sectional shape, and is applied to the substrate through the liquid film, illuminating.

13 Claims, 13 Drawing Sheets

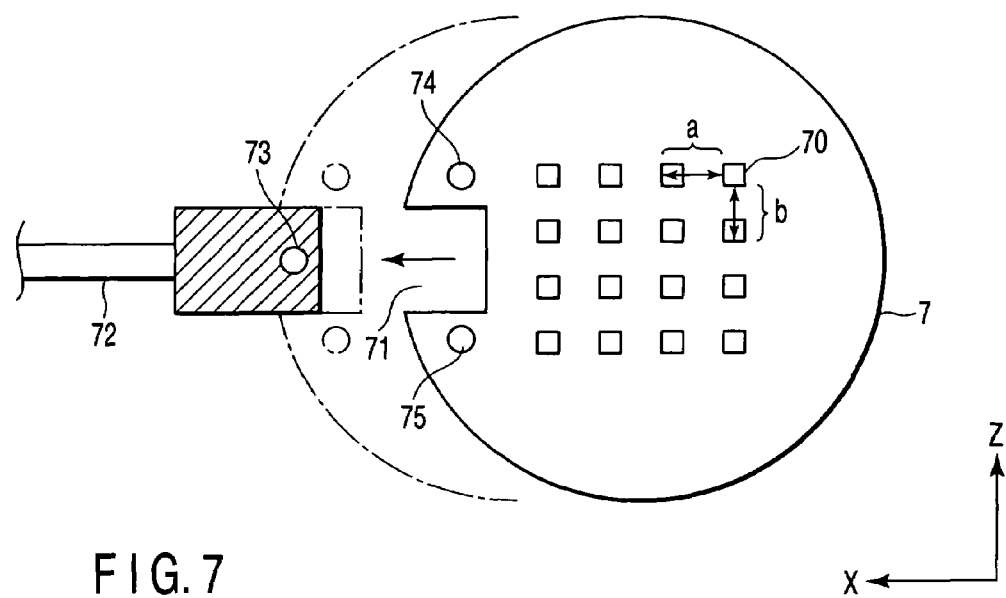
F I G. 7
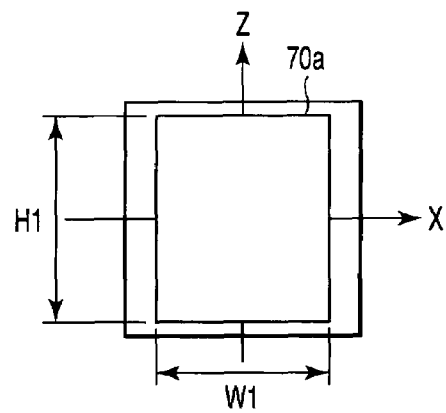
F I G. 8A
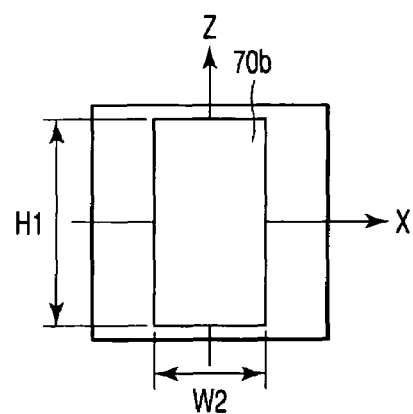
F I G. 8B

LASER PROCESSING APPARATUS AND LASER PROCESSING METHOD

CROSS-REFERENCE TO RELATED APPLICATIONS

This application is based upon and claims the benefit of priority from prior Japanese Patent Application No. 2004-310749, filed Oct. 26, 2004, the entire contents of which are incorporated herein by reference.

BACKGROUND OF THE INVENTION

1. Field of the Invention

The present invention relates to a laser processing apparatus and a laser processing method, in which liquid is applied to a surface of a substrate such as a semiconductor wafer or a glass substrate for use in liquid crystal displays, and the substrate covered with liquid is scanned with a laser beam and thereby processed.

2. Description of the Related Art

Methods of manufacturing semiconductor devices include steps of processing the surface of a substrate, by using a laser beam. Among these steps are: processing a thin film such as an insulating film, a metal film or a resist film; cutting dicing lines; removing resist films from alignment marks before exposing the substrate to light (i.e., step of exposing the alignment marks). It is desired that a laser beam be used in these steps because it has a high energy density and can accomplish high-precision alignment.

When a laser beam is applied to a substrate to process the surface of the substrate, some substance is removed from the substrate sticks, in the form of vapor. The substance sticks to the surface of the substrate. It is proposed that, to prevent the substance from sticking to the substrate, the surface of the substrate be covered with liquid and then be scanned with a laser beam. Jpn. Pat. Appln. KOKAI Publication No. 2003-249427, for example, discloses a laser processing apparatus. As FIG. 1 shows, the apparatus has a cup 11, a drive mechanism 12, and a chuck 13. The drive mechanism 12 can rotates the chuck 13 and move the chuck 13 in the X- and Y-directions, positioning the chuck 13 in the cup 11. The chuck 13 may hold a substrate 10, which has alignment marks and resist films covering the alignment marks. A laser beam 18 is applied to the resist films, removing the resist films from the substrate 10. A transparent plate 15 made of quartz glass is spaced a little from the substrate 10, facing the substrate 10. Pure water is kept flowing through gap between the substrate 10 and the transparent plate 15, supplied through an inlet port and drained from the gap trough an outlet port. After the substrate 10 has undergone the laser processing, the plate 15 is raised and rotated at high speed. By virtue of centrifugal force, the pure water is removed from the substrate 10, thus drying the substrate 10.

In the laser processing method using a liquid film, it is necessary to shape the laser beam 18 so that the beam may have an appropriate cross-sectional shape. Unless the beam is so shaped, a groove of an undesirable shape will be made in the surface of the substrate when the beam is applied to the substrate. As FIG. 2A shows, the pulse laser beams 160 may be sequentially applied, thus scanning a selected region of a substrate, in the direction of arrow 152, along a dicing line 150. In this case, great energy is abruptly applied over the entire width of the dicing line 150 if the pulse laser beams 160 have a rectangular cross section. Consequently, the resultant groove may not have sharp upper edges. When the substrate is cut along such grooves, chips are provided, each having but an undesirable shape.

To prevent this, the cross-sectional shape of the beam must be changed to, for example, a shape shown in FIG. 2B. This shape is defined a first rectangle and a second rectangle. The second rectangle adjoin the middle part of the first rectangle and positioned in front thereof in the scanning director. Thus, the laser beam needs to have a cross-sectional shape selected in accordance with the type of the process in which it is used, such as dicing process or thin-film removing process. An apparatus that changes the cross-sectional shape of a laser beam is described in, for example, Jpn. Pat. Appln. KOKAI Publication No. 2002-224878, paragraphs [0049] and [0148].

The inventors of this invention know that the cross-sectional shape of a laser beam should better be adjusted in accordance with the width and depth of the groove to be made by applying the laser beam, even if the groove is made in, for example, a thin film. In view of this, it is desirable to select a cross-sectional shape for the laser beam in accordance with the type of the process performed by using the laser beam. It is strongly demanded that an apparatus be provided, in which an appropriate cross-sectional shape can be easily set for the laser beam.

The apparatuses described in Jpn. Pat. Appln. KOKAI Publications Nos. 2003-249427 and 2002-224878 has no function of setting an appropriate cross-sectional shape for the laser beam. It is demanded that grooves of different widths be made in, for example, a thin film. To meet this demand, slits (patterns) must be changed to have widths corresponding to the widths of the grooves. This would take much labor and time.

BRIEF SUMMARY OF THE INVENTION

An object of this invention is to provide a laser processing apparatus and a laser processing method, which can easily and fast set various cross-sectional shapes for a laser beam, in accordance with the type of the process that is performed by using the laser beam.

A laser processing apparatus according to the invention comprises a laser source unit which emits a laser beam; a substrate-holding unit which holds a substrate; a liquid-supplying unit which supplies liquid to a surface of the substrate; a support which is arranged between the laser source unit and the substrate-holding unit and which has a plurality of mask patterns including a specific mask pattern for imparting a cross-sectional shape to the laser beam; and a support-driving mechanism which moves the support. The liquid-supplying unit supplies the liquid to the surface of the substrate, forming a film of liquid thereon. The support-driving mechanism moves the support, aligning the specific mask pattern with an axis of the laser beam. The laser beam emitted from the laser source unit passes through the specific mask pattern, acquiring a specific cross-sectional shape. The beam is then applied to the surface of the substrate through the film of liquid, illuminating a surface region of the substrate.

The support is preferably a plate having mask patterns of various types formed by etching. A high-precision mask pattern can be formed on the plate at low cost, by means of pattern etching that uses photolithography. The plate is made of material that can well undergo dry etching or wet etching. It may be made of metal, ceramics, resin, or semiconductor such as silicon. It is desired that the plate be made of material that hardly form particles.

The support-driving mechanism may be a linear drive mechanism that moves the support in an X direction and a Z direction, or in at least one of the X and Z directions. The support-driving mechanism may further have a rotation mechanism that rotates the support in an X-Z plane that is at right angles to the axis of the laser beam.

The apparatus according to the invention may further comprises pattern-selecting means for selecting the specific mask pattern from said plurality of mask patterns, and a control unit which controls the support-driving mechanism, causing the support-driving mechanism to align the specific mask pattern with the axis of the laser beam.

The apparatus according to the invention may further comprise: pattern-selecting means for selecting one of said plurality of mask patterns, and a control unit which controls the support-driving mechanism, causing the support-driving mechanism to align the selected mask pattern with the axis of the laser beam. In this case, the pattern-selecting means preferably has a display unit that displays said plurality of mask patterns including the specific mask pattern. The control unit may store correlation data representing a relation between types of laser processes and types of mask patterns. The pattern-selecting means may select one type of a laser processing method and selects the mask pattern corresponding to the selected type of a laser process.

Another laser processing apparatus according to the invention is designed to supply liquid to a surface of a substrate held on a substrate-bolding unit, forming a film of liquid, a laser beam emitted from a laser source unit is guided through a mask pattern, thus acquiring a specific cross-sectional shape, and the laser beam is applied to the surface of the substrate through the film of liquid, thus scanning a selected region of the substrate with the laser beam. The apparatus has a support, which has the mask pattern in alignment with an axis of the laser beam and which can be rotated around the axis of the laser beam.

This apparatus may further comprise a rotation mechanism that rotates the support. Further, the apparatus may comprise: an angle-setting mechanism that sets an angle of orientation for the mask pattern, and a control unit which controls the rotation mechanism, causing the rotation mechanism to rotate the mask pattern by the angle of orientation set by the angle-setting mechanism. The control unit stores correlation data representing a relation between types of laser processes and types of mask patterns. The apparatus may further has a pattern-selecting means, which selects one type of a laser processing method and selects the mask pattern corresponding to the selected type of a laser process. For example, if the control unit stores the correlation data representing a relation between types of laser processes and types of mask patterns, the angle-setting mechanism can set an angle of orientation for any mask pattern selected, when a type of a laser processing method is selected in accordance with the correlation data.

A laser processing method according to the invention is designed to supply liquid to a surface of a substrate held on a substrate-bolding unit, forming a film of liquid. In the method, a laser beam emitted from a laser source unit is guided through a mask pattern, thus acquiring a specific cross-sectional shape, and the laser beam is applied to the surface of the substrate through the film of liquid, thus scanning a selected region of the substrate with the laser beam.

The method comprises the steps of:

(a) holding the substrate on the substrate-holding unit;

(b) supplying the liquid to the surface of the substrate held on the substrate-holding unit, forming a film of liquid on the surface of the substrate;

(c) selecting a specific one of mask patterns that define various cross-sectional shapes for the laser beam;

(d) moving a support having the mask patterns, aligning the specific mask pattern with an axis of the laser beam; and (e) guiding the laser beam through the specific mask pattern, imparting a specific cross-sectional shape to the laser beam, then applying the laser beam to the surface of the substrate through the film of liquid, illuminating a surface region of the substrate.

In the step (d), the support may be moved in an X direction and a Z direction, or may be moved in at least one of the X and Z directions and be rotated in an X-Z plane that is at right angles to the axis of the laser beam.

In the step (c), the mask patterns may be displayed on a screen of a display unit and the specific mask patterns displayed may be selected from the mask patterns displayed.

Another laser processing method according to the invention is designed to supply liquid to a surface of a substrate held on a substrate-bolding unit, forming a film of liquid. In the method, a laser beam emitted from a laser source unit is guided through a mask pattern, thus acquiring a specific cross-sectional shape, and the laser beam is applied to the surface of the substrate through the film of liquid, thus scanning a selected region of the substrate with the laser beam.

This method comprises the steps of:

(i) holding the substrate on the substrate-holding unit;

(ii) supplying the liquid to the surface of the substrate held on the substrate-holding unit, forming a film of liquid on the surface of the substrate;

(iii) setting an angle of orientation for a mask pattern that defines a cross-sectional shape for the laser beam;

(iv) rotating a support having the mask pattern, around an axis of the laser beam by the angle of orientation set; and (v) guiding the laser beam through the mask pattern, imparting a cross-sectional shape to the laser beam, then applying the laser beam to the surface of the substrate through the film of liquid, illuminating a surface region of the substrate.

BRIEF DESCRIPTION OF THE SEVERAL VIEWS OF THE DRAWING

FIG. 7 is a plan view explaining how the support unit is connected to a support arm;

FIGS. 8A to 8G are schematic diagrams showing various mask patterns that the support unit may support;

DETAILED DESCRIPTION OF THE INVENTION

Laser processing apparatuses, i.e., embodiments of this present invention, will be described with reference to the accompanying drawings.

First Embodiment

Figure 1:
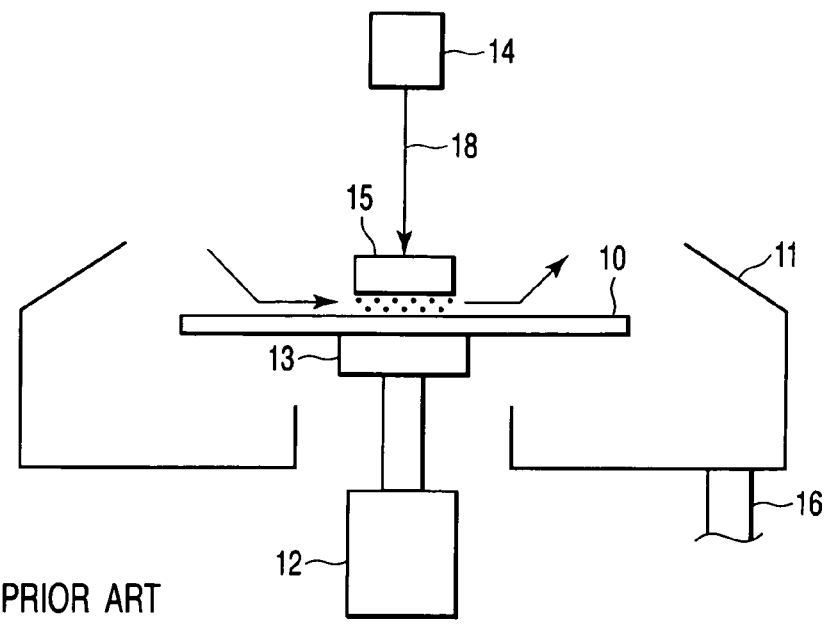
FIG. 1 is a schematic, sectional view of a conventional laser processing apparatus, illustrating the internal structure of the apparatus.
Figure 2A:
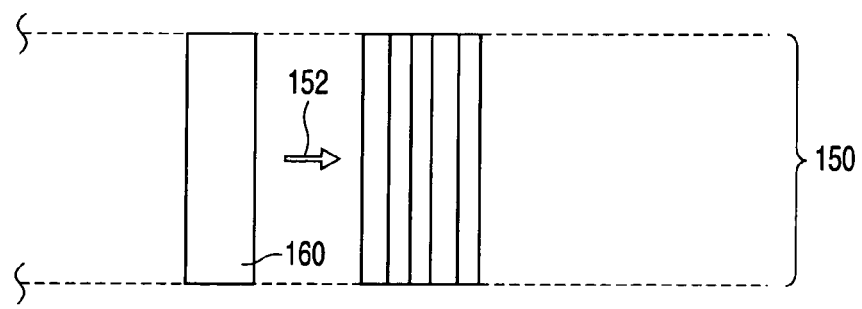
FIGS. 2A and 2B are diagrams schematically showing two laser beams that are applied, in two conventional laser processes, respectively, to the surface of a substrate to form dicing lines.
Figure 2B:
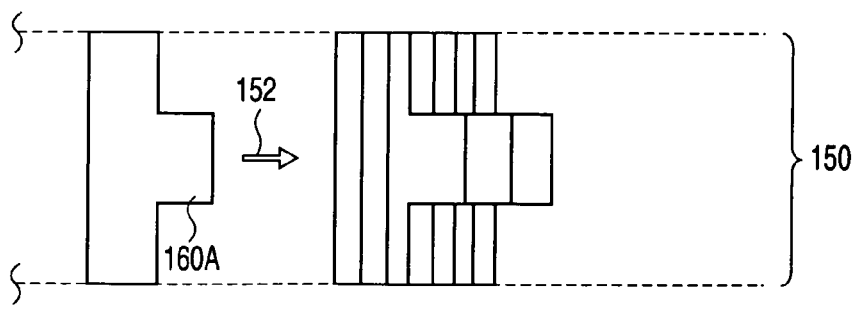
Figure 3:
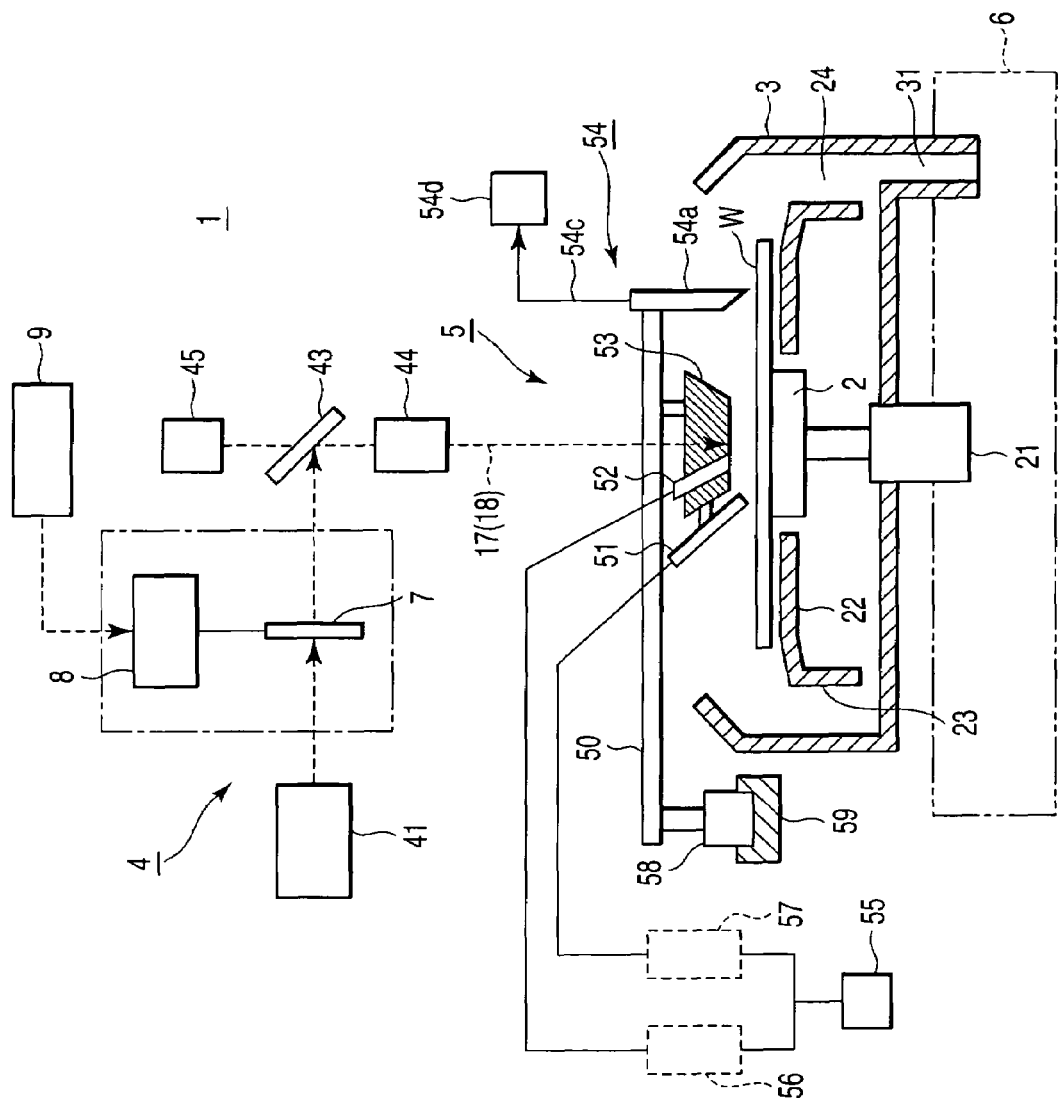
FIG. 3 is a block diagram depicting a laser processing apparatus according to an embodiment of this invention.

FIG. 3 is a block diagram depicting a laser processing apparatus that is a first embodiment of this invention. The laser processing apparatus 1 is used in various processes such as dicing and processing of thin films. More specifically, the apparatus 1 can process various thin films such as insulating film, metal film and resist film, can form dicing lines and can remove a resist film from alignment marks to expose the marks to light. The apparatus 1 has a spin chuck 2, a cup 3 and a drive unit 21. The spin chuck 2 is a substrate-holding unit for holding a wafer W by suction, keeping the wafer W in a horizontal position. The chuck 2 is arranged in the cup 3, which is shaped like a hollow cylinder. The drive unit 12 rotates the spin chuck 2 around a vertical axis (Z-axis) and moves the spin chuck 2 up and down along the Z-axis.

The cup 3 has an outlet port (draining port) 31 made in the bottom and located near the circumference of the bottom. Through the outlet port 31, the liquid (e.g., pure water) falling down from the wafer W can be discharged from the apparatus 1.

The apparatus 1 has a horizontal plate portion 22. The plate portion 22 lies right below the wafer W held by the chuck 2 and surrounds the chuck 2. The circumferential edge of the plate portion 22 is bent downwards, forming a hollow cylinder 23. The hollow cylinder 23 and the cup 3 define a passage 24. Pure water can flow through the passage 24 before it is discharged through the draining port 31.

The apparatus 1 comprises a laser unit 4 and a liquid-film forming unit 5. The laser unit 4 applies a laser beam to the wafer W, in order to perform a specific process (e.g., dicing or removal of a resist film or an insulating film). The liquid-film forming unit 5 is designed to form a liquid film on the wafer W. The laser unit 4 is secured to a housing (not shown) and comprises a laser oscillator 41, a support 7, a support-driving mechanism 8, a control unit 9, a half-mirror 43, and an optical system unit 44.

The laser oscillator 41 is a laser source unit such as a YAG laser or an excimer laser and emits a process laser beam. The support 7 is a member that has various mask patterns that impart various cross sectional shapes to the laser beam. The support-driving mechanism 8 can drive the support 7 in the X- and Z-direction. The control unit 9 controls the support-driving mechanism 8. Controlled by the unit 9, the mechanism 8 moves the support 7, which brings one of the mask patterns into alignment with the axis 17 of the laser beam 18.

The half-mirror 43 reflects the laser beam toward the surface of the wafer W. Note that the laser beam 18 has its cross-sectional shape changed at the support 7. The optical system unit 44, which is located below the half-mirror 43, adjusts the intensity, phase and orientation of the laser beam 18. Above the half-mirror 43, a CCD camera 45 is provided. The CCD camera 45 is so positioned that it has an optical axis aligns with the axis 17 of the laser beam 18 traveling toward the surface of the wafer W. The camera 45 functions as a position detector.

The control unit 9 stores programs for performing various controls, which will be described later. The control unit 9 controls some other components of the apparatus 1, including the support-driving mechanism 8. The lines connecting the control unit 9 to the components to be controlled are not shown, except the line that connects the unit 9 to the support-driving mechanism 8.

The liquid-film forming unit 5 comprises liquid-supplying nozzles 51 and 52, a liquid-guiding member 53, and a liquid-recovering section 54. The liquid-supplying nozzles 51 and 52 supply liquid (e.g., pure water) to the wafer W. The liquid-guiding member 53 guides the pure water flowing on the wafer W, thus forming a film of liquid. The liquid-recovering section 54 recovers the liquid that has passed that part of the surface of the water W, which is illuminated with the laser beam. The liquid-guiding member 53 is made of transparent material such as quartz glass and is shaped like an inverted cone.

The nozzle 51 is fixed outside the liquid-guiding member 53. Two nozzles 52, only one of which is shown in FIG. 3, are provided in the liquid-guiding member 53. The nozzles 52 are arranged with their outlet ports located on the sides of the outlet port of the nozzle 51, respectively. The liquid is applied from the center nozzle 51 at speed of, for example, 20 m/min, and from the lateral nozzles 52 at a speed that is considerably lower than said speed. Thus, anything that should be removed (anything exfoliated) can be washed away with the liquid flowing fast from the surface of the wafer W, without being dispersed, during the laser processing method such as dicing or removal of resist film or insulating film. Reference numeral 55 denotes a source of pure water. Reference numerals 56 and 57 are supply control systems, each incorporating a valve, a flow-rate adjusting unit, a pump and the like.

Figure 4:
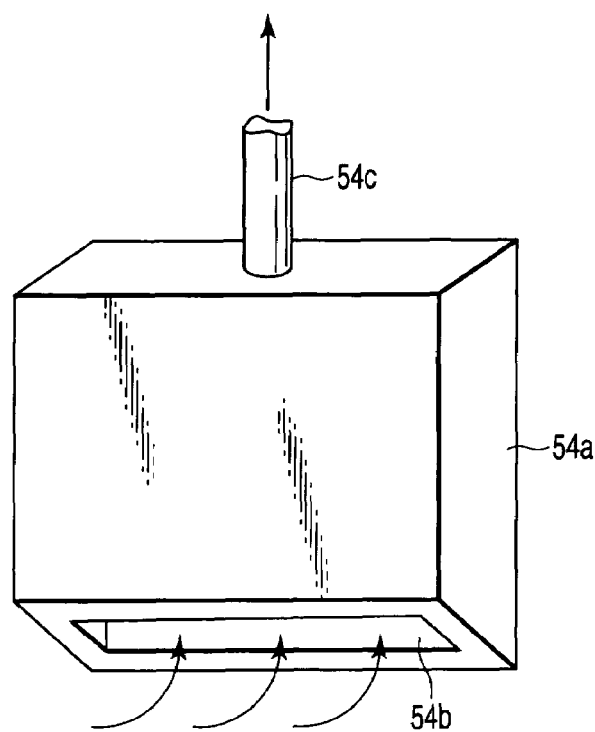
FIG. 4 is a perspective view of the recovery nozzle for recovering liquid.

The liquid-recovering section 54 is shaped like a rectangular block as shown in FIG. 4. The section 54 has a recovering nozzle 54a, a recovering passage 54c and a suction means 54d. The recovering nozzle 54a has a suction port 54b at the distal end so that the liquid may be recovered while flowing, in the form of a band, on the surface of the water W. As seen form FIG. 3, the suction means 54d is an ejector that applies a suction force on the recovering nozzle 54a through the recovering passage 54c.

The liquid-guiding member 53 and the recovering nozzle 54a are secured a support arm 50. A lift mechanism 58 is provided at the proximal end of the support arm 50. As FIG.

3 shows, the lift mechanism 58 can move along a rail 59 that extends in the direction perpendicular to the drawing. Hence, the support arm 50 can move not only up and down, but also in one direction in a horizontal plane. The configuration of the liquid-film forming unit 5 is not limited to the one described above. It may have one of various configurations disclosed in, for example, Jpn. Pat. Appln. KOKAI Publication No. 2003-249427.

Figure 5:
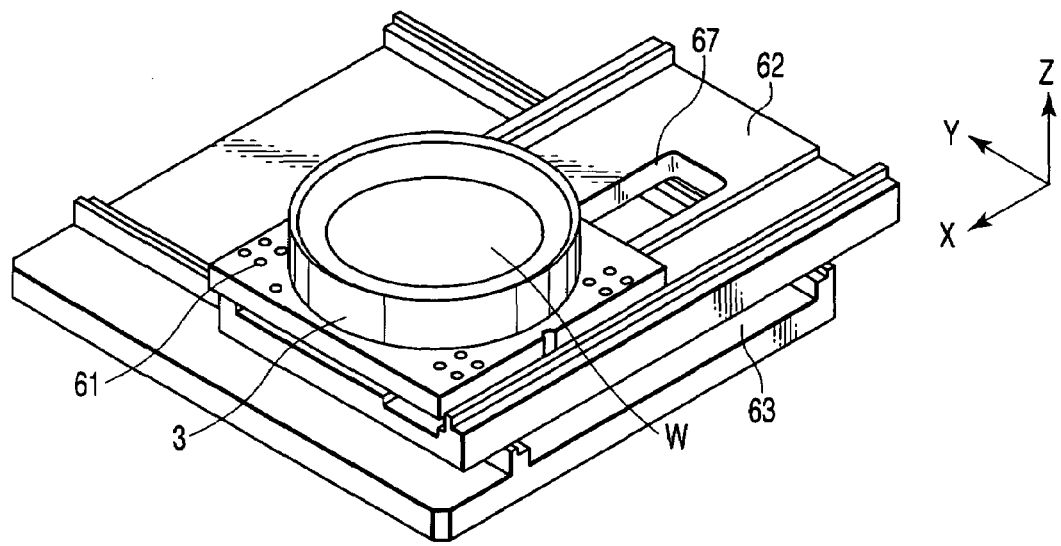
FIG. 5 is a perspective view illustrating a cup and a drive mechanism.

As FIG. 3 shows, the laser processing apparatus 1 has an X-Y stage 6 as indicated by a two-dot, dashed line in FIG. 3. The X-Y stage 6 is a drive mechanism that moves the cup 3 in a horizontal plane. As FIG. 5 shows, the X-Y stage 6 comprises a first stage 61, a second stage 62, and a base 63. The first stage 61 holds the cup 3. The second stage 62 has a drive mechanism that can drive the first state 61 in the X direction. The second state 62 can move on the base 63 that is secured to the above-mentioned housing (not shown). That is, the first stage 61 can move in the X direction, and the second stage 62 can move in the Y direction. The base 63 has a drive mechanism that can drive the second stage 62 in the Y direction.

The support 7 and the support-driving mechanism 8 will be described, with reference to FIG. 6, FIG. 7, FIGS. 8A to 8G and FIGS. 9A to 9G.

The support 7 is a plate made of, for example, ceramic, silicon or stainless steel (SUS304). It is 0.1 to 1.0 mm thick and is, for example, a disc. The support unit 7 has various mask patterns (slits) 70 that have been formed by etching.

As FIG. 7 shows, the support unit 7 has 16 mask patterns 70. The mask patterns 70 are arranged in rows and columns. The patterns 70 are arranged in very row at pitch of, for example, 0.5 mm, and in every column at pitch b of, for example, 0.5 mm.

The mask patterns of various types are shown in FIGS. 8A to 8G and FIGS. 9A to 9G. The mask patterns 70a, 70b, 70c and 70d shown in FIGS. 8A, 8B, 8C and 8D, respectively, have the same Z-direction length (height) Hl of, for example, 140 µm and different X-direction lengths (widths) W1, W2, W3 and W4 of, for example, 120 µm, 80 µm, 40 µm and 20 µm. The mask pattern 70e shown in FIG. 8E consists of two patterns that have the same height Hi of, for example, 140 µm and the same width W5 of, for example, 40 µm. These mask patterns 70e are symmetrical to each other with respect to the Z-axis, located on the left and right sides of the Z-axis.

Figure 8C:
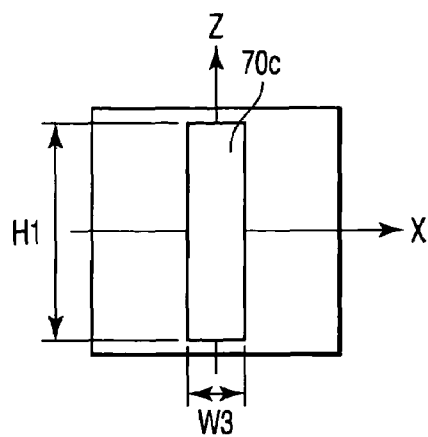
Figure 8F:
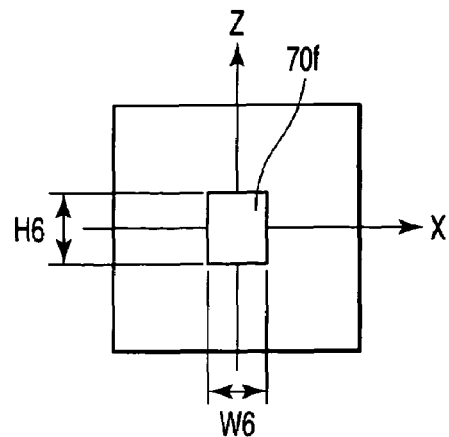
Figure 8D:
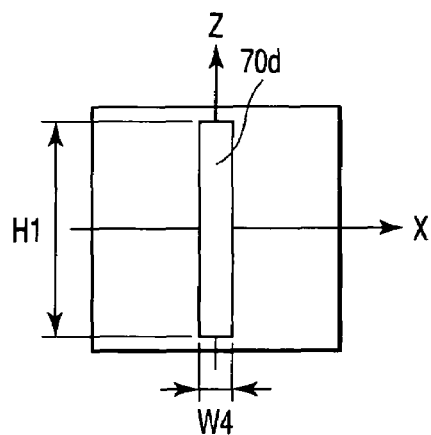
Figure 8G:
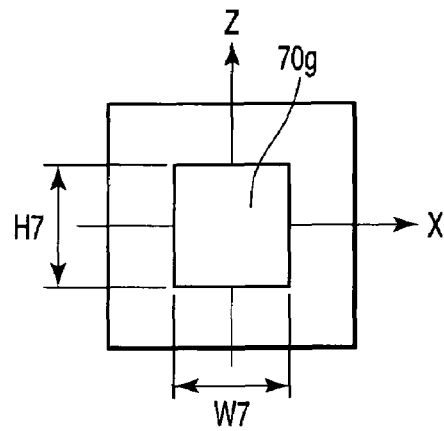
Figure 8E:
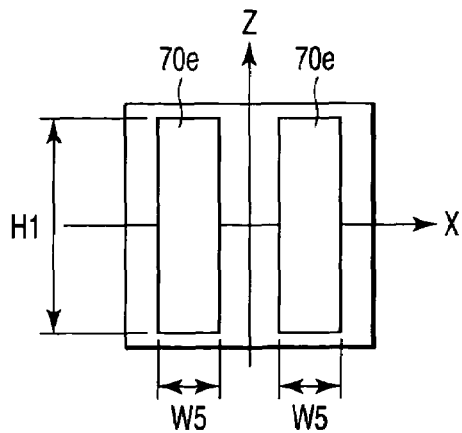

The mask pattern 70f shown in FIG. 8F is a square having height H6 and width W6 of, for example, 40 m. The mask pattern 70g shown in FIG. 8G is a square, too, which has height H7 and width W7 of, for example, 80 µm. The mask pattern 70g is larger than the mask pattern 70f.

Figure 9A:
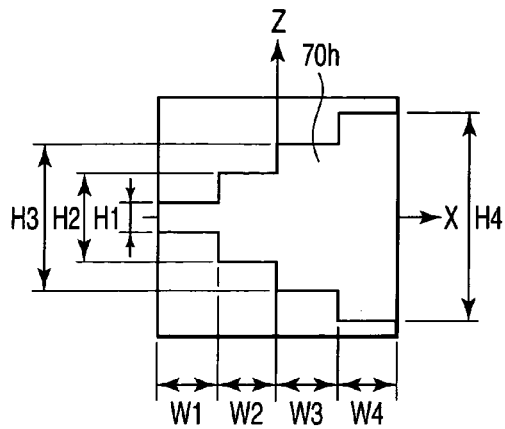
FIGS. 9A to 9G are schematic diagrams showing other mask patterns that the support unit may support.

The mask pattern 70h shown in FIG. 9A is a four-stepped pattern, having a height increasing stepwise from the side parallel to the Z-axis toward the opposite side. The four parts have Z-direction lengths (heights) H1, H2, H3 and H4 of, or example, 20 µm, 60 µm, 100 µm and 140 µm. Their X-direction lengths (widths) W1, W2, W3 and W4 are, for example, 40 µm.

Figure 9D:
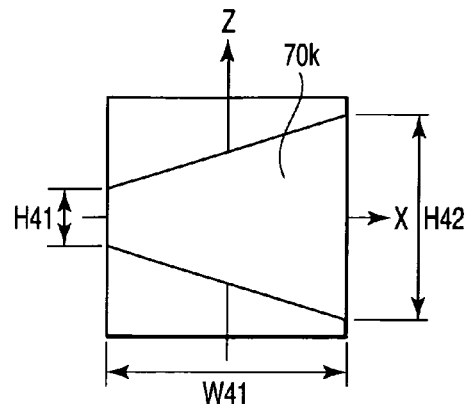
Figure 9B:
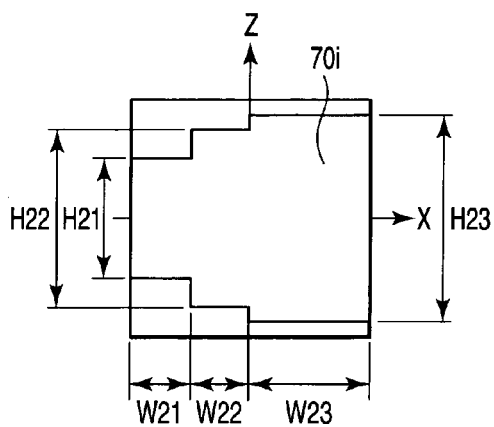

The mask pattern 70i shown in FIG. 9B is a three-stepped pattern, having a height increasing stepwise from the side parallel to the Z-axis toward the opposite side. The three parts have Z-direction lengths (heights) H21, H22 and H23 of, or example, 80 µm, 110 µm and 140 µm. Their X-direction lengths (widths) W21, W22 and W23 are, for example, 40 µm, 40 µm and 80 µm, respectively.

Figure 9E:
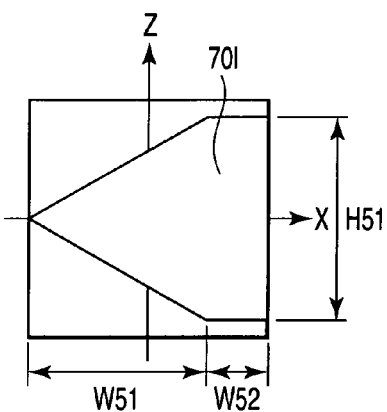
Figure 9C:
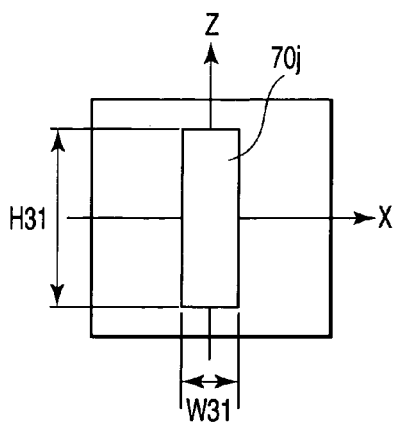

The mask pattern 70j shown in FIG. 9C is a rectangular pattern extending vertically and has height H31 of, for example, 120 µm and width W31 of, for example, 40 µm. The mask pattern 70k shown in FIG. 9D is a trapezoidal pattern extending horizontally, which has heights H41 and H42 of, for example, 40 µm and 140 µm, respectively, and a width W41 of, for example, 160 µm.

The mask pattern 70l shown in FIG. 9E is a combination of a triangle and a rectangle, which have the same height H51 of, for example, 140 µm, and widths W51 and W52 of, for example, 120 µm and 40 µm, respectively. (Thus, this mask pattern is shaped like a home base.)

Figure 9F:
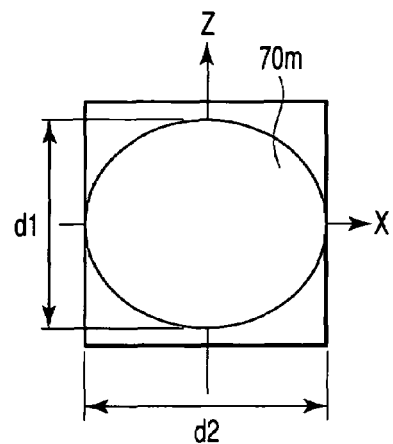
Figure 9G:
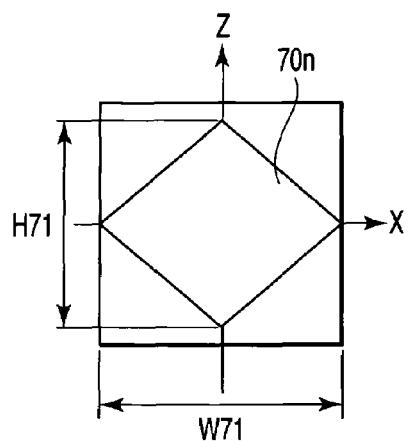

The mask pattern 70m shown in FIG. 9F is an elliptical pattern that has a minor axis d1 (Z-direction diameter) of 140 µm and triangle and a major axis d2 (Y-axis diameter) of 140 µm. The mask pattern 70n shown in FIG. 9G is a parallelogram that has a shorter diagonal H71 of 140 µm, extending in the Z-direction, and a longer diagonal W71 of 160 µm, extending in the X-direction.

The mask patterns shown in FIGS. 8A to 8G and FIGS. 9A to 9G have specific positional relationship with the direction in which the laser beam scans the surface of the substrate. That is, beam spots having the shapes shown in FIGS. 8A to 8G and FIGS. 9A to 9G move on the substrate to the left (in X direction), in the plane of the drawing.

The support unit 7 has a notch 71 cut in the circumferential edge. As FIG. 7 shows, the distal end of a support arm 72 can fit in the notch 71. The support arm 72 has a hole 73 in its proximal end.

The support 7 has two holes 74 and 75, which are located above and below the notch 71, respectively. When the distal end of the support arm 72 is fitted in the notch 71, the hole 73 made in the support arm 72 comes into vertical alignment with the holes 74 and 75 made in the support 7. As FIG. 6 depicts, bolts are driven into the holes 73, 74 and 75 through the holding member 76, fastening the support 7 to the support arm 72 and setting the support 7 in a specific orientation.

Figure 6:
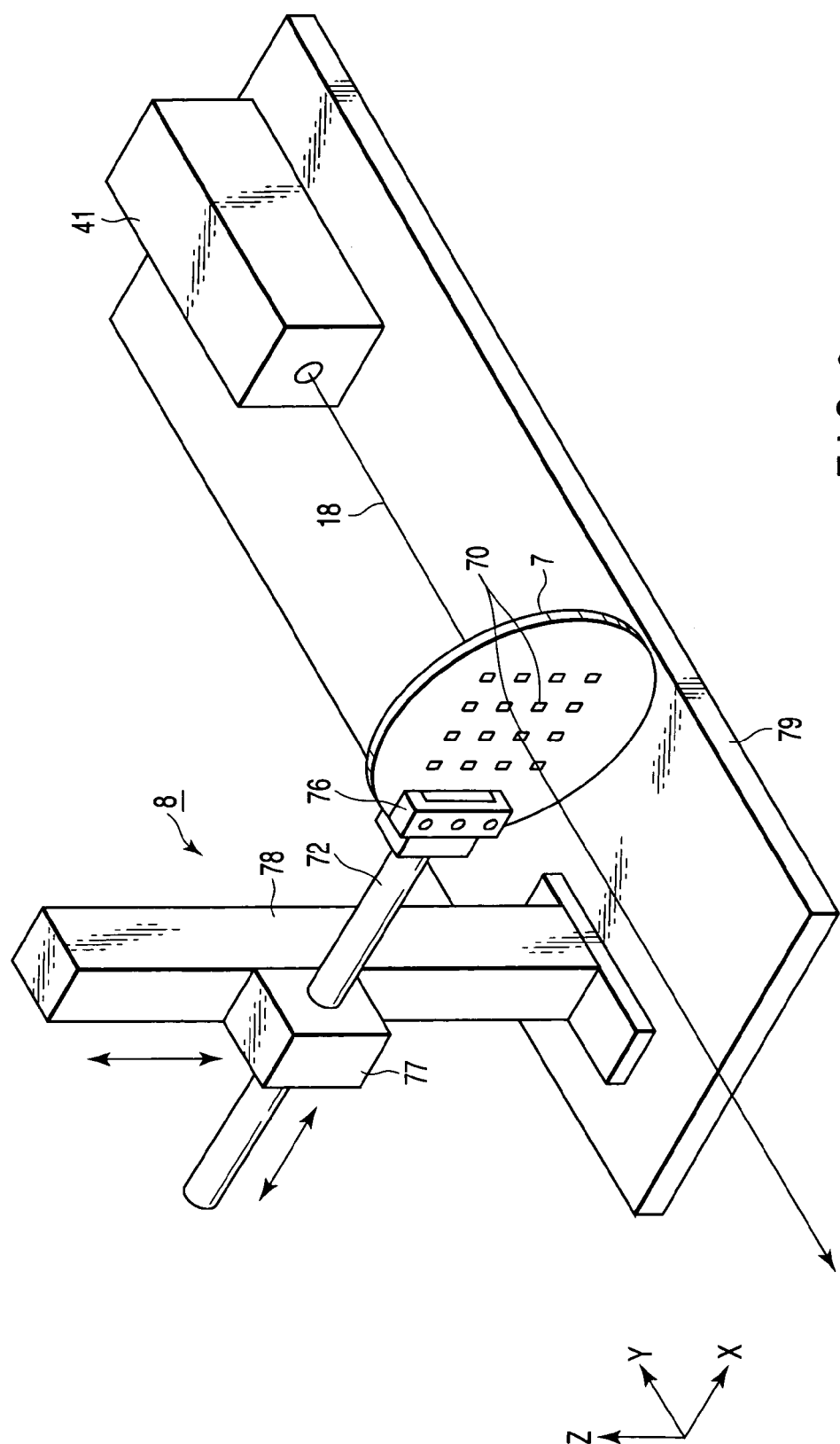
FIG. 6 is a perspective view showing a support unit and a support-driving mechanism.

As shown in FIG. 6, an X-axis drive mechanism 77 holds the support arm 72 and can drive the support arm 72 in the X-axis direction. The X-axis driving mechanism 77 is supported by a Z-axis drive mechanism 78, which can drive the X-axis drive mechanism 77 parallel to the Z-axis. The X-axis drive mechanism 77 and the Z-axis drive mechanism 78 constitute the support-driving mechanism 8. The support-driving mechanism 8 can therefore move the support 7 in the X direction (horizontal direction) and the Z direction (vertical directions). Hence, the mechanism 8 can align any one of the mask patterns 70 made in the support 7 with the axis 17 of the laser beam. The mechanisms 77 and 78 comprise a guide rail, a ball-screw mechanism and an electric motor. The Z-axis drive mechanism 78 is fastened at lower end to a base 79 that is horizontally held. The base 79 is secured to the housing (not shown) of the laser-process apparatus.

Figure 10:
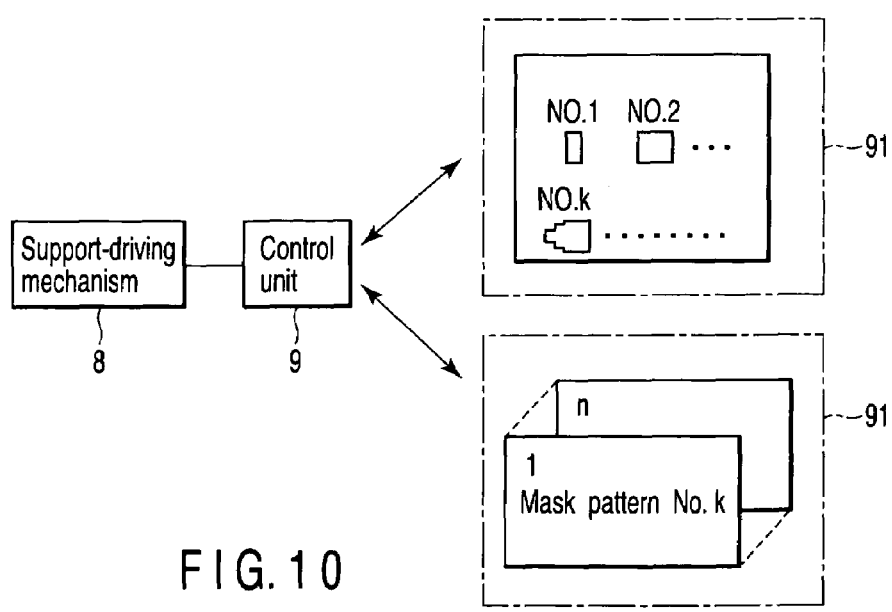
FIG. 10 is a block diagram schematically representing a control unit and showing images that a display unit may display.

FIG. 10 illustrates a system that selects one of the mask patterns made in the support 7. A display unit 91 is connected to the control unit 9. The system can selects a mask in two modes. In the first mode, the display unit 91 displays the mask patterns in accordance with recipe that describes the parameters of various processes. More precisely, the unit 91 displays the process parameters in the receipt screen. The process parameters are, for example, the types of mask patterns (made in the support 7). In other words, the control unit 9 stores data representing relation between the laser processes and the mask patterns. Therefore, the mask pattern corresponding to any laser processing method selected on the basis of the data is automatically selected. In the second mode, the display unit 91 displays the serial numbers (No. 1, No. 2, . . . ) assigned to the mask patterns. The operator may click any serial number desired. Then, the mask pattern of the number clicked will be automatically selected.

The control unit 9 stores a program for outputting a control signal to the support-driving mechanism 8 when the operator selects one of the mask pattern displayed by the display unit 91. In accordance with the control signal, the mechanism 8 moves the support 7, aligning the selected mask pattern 70 with the axis 17 of the laser beam.

How the embodiment described above operates will be explained below.

A transfer arm (not shown) transfers a wafer W having an integrated circuit formed in it, to the chuck 2 provided in the cup 3 located at a wafer-transfer position. That is, the chuck 2 is first raised, then receives the wafer W, and is lowered. The X-Y stage 6 moves the cup 3 until the dicing-start point on the wafer W is aligned with the axis of the laser unit 4. The CCD camera 45 detects the orientation flat or notch of the wafer W, generating a position signal representing the position of the orientation flat or notch. The wafer W is positioned on the basis of the position signal.

Next, the operator selects one of the various mask patterns 70a-70n made in the support 7, which are displayed by the display unit 91. (The operator selects, for example, the mask pattern 70l shown in FIG. 9E.) In accordance with the program stored in it, the control unit 9 controls the support-driving mechanism 8. Thus controlled, the mechanism 8 moves the support 7 to a prescribed position where the selected mask pattern is aligned with the axis 17 of the laser beam emitted from the laser oscillator 41.

Figure 11:
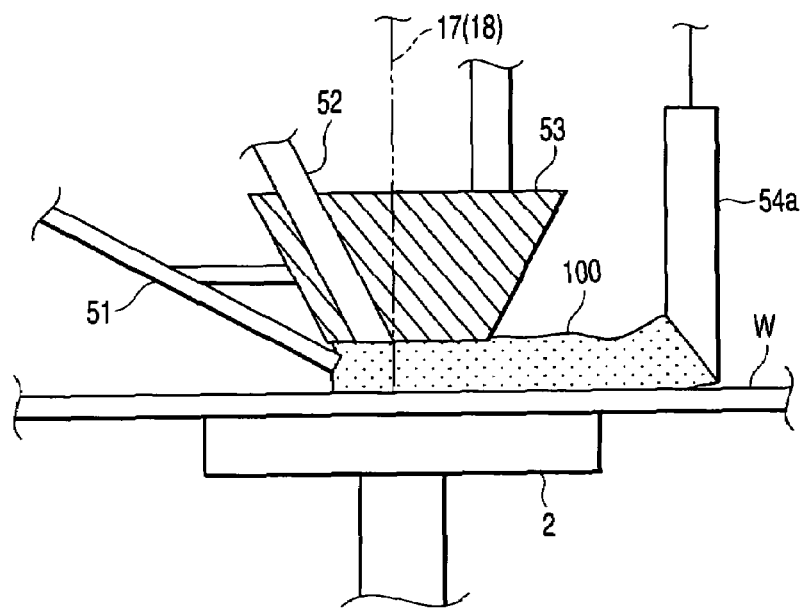
FIG. 11 is a schematic diagram showing a laser beam applied to a substrate through a liquid film formed on the substrate.

Subsequently, the support arm 50 moves the liquid-supplying nozzles 51 and 52, liquid-guiding member 53 and recovering nozzle 54a from the standby position to a predetermined position near the surface of the wafer W. The predetermined position is, for example, 2 mm above the wafer W. Then, the liquid-supplying nozzles 51 and 52 supply liquid, or pure water in this embodiment, to the surface of the wafer W. A water film (liquid film) 100 is thereby formed below the liquid-guiding member 53, as is illustrated in FIG. 11. At this time, the suction means 54d of the liquid-recovering section 54 is driven. The recovering nozzle 54a therefore recovers the liquid after guided by the liquid-guiding member 53.

While a film of pure water remains on the wafer W and the laser beam 18 emitted from the laser unit 4, having a prescribed cross section and passing through the liquid-guiding member 53 is illuminating the surface of the wafer W, the X-Y stage 6 repeatedly moves the chuck 2, first in the X direction and then in the Y direction. Thus, the laser beam 18 having the scans the surface of the wafer W along lines extending in the X direction, and then along lines extending in the Y direction. That is, pulse laser beams having the cross section corresponding to the selected mask pattern are sequentially applied to the surface of the wafer W, the wafer W is half-cut, forming dicing lines, some of which extend in the X direction and the others of which in the Y direction.

Figure 12:
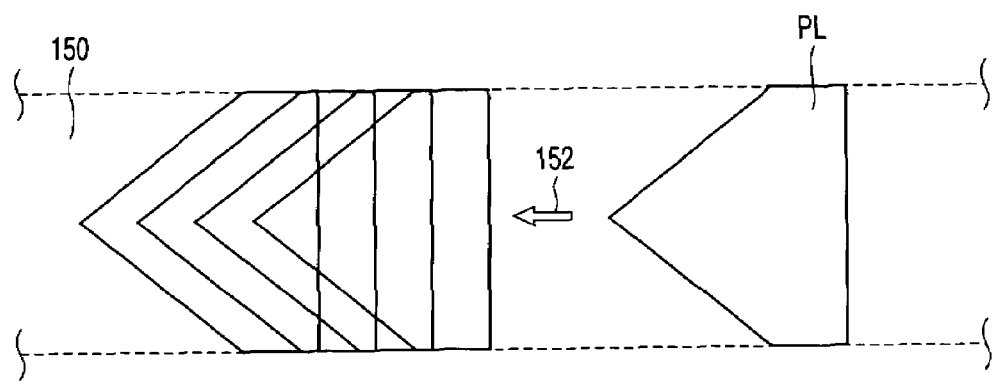
FIG. 12 is a diagram schematically illustrating the cross-sectional shape that a laser beam has, which is applied to a substrate to form a dicing line in a surface of the substrate by a laser processing method according to this invention.

The pulse laser beams used in this instance are of the type PL shown in FIG. 12. This laser beam PL has a cross section that is shaped like a home base. Its cross section gradually narrows from the base toward the apex, in the plane that is at right angles to the direction 152 in which the laser beam scans the wafer. In this case, the rims of each groove, i.e., a dicing liner, are prevented from being rounded. The wafer W will be cut along the dicing lines from the lower surface, into a number of chips.

In the first embodiment described above, the support-driving mechanism 8 moves the support 7 having mask patterns of various types, aligning one of the mask patterns with the axis 17 of the laser beam 18 emitted from the laser oscillator 41. Hence, the cross-sectional shape of the laser beam 18 can be easily adjusted. In other words, the cross section of the laser beam 18 can be easily changed to one desirable for the laser processing method to be performed on the wafer W. Thus, laser processes, such as cutting dicing lines in a silicon wafer and peeling resist films from specified regions of a silicon wafer, can be minutely controlled. Since the same laser-process apparatus can perform such various processes, a very versatile system can be constituted, which achieves good results in each laser process.

As has been explained with reference to FIG. 10, the operator selects one of the mask patterns displayed on the display unit 91, and the support 7 having the mask patterns is moved to align the selected mask pattern with the axis 17 of the laser beam 18. This makes it very easy to set a desired mask pattern. Further, the operator makes no errors in setting a desired mask pattern, even if he or she is not skilled in the work. This is because he or she only needs to select the mask pattern on the screen of the display unit 91. Once the mask pattern is so selected, the mask pattern is automatically aligned with the axis 17 of the laser beam 18.

A modification of the first embodiment described above will be described, with reference to FIG. 13.

Figure 13:
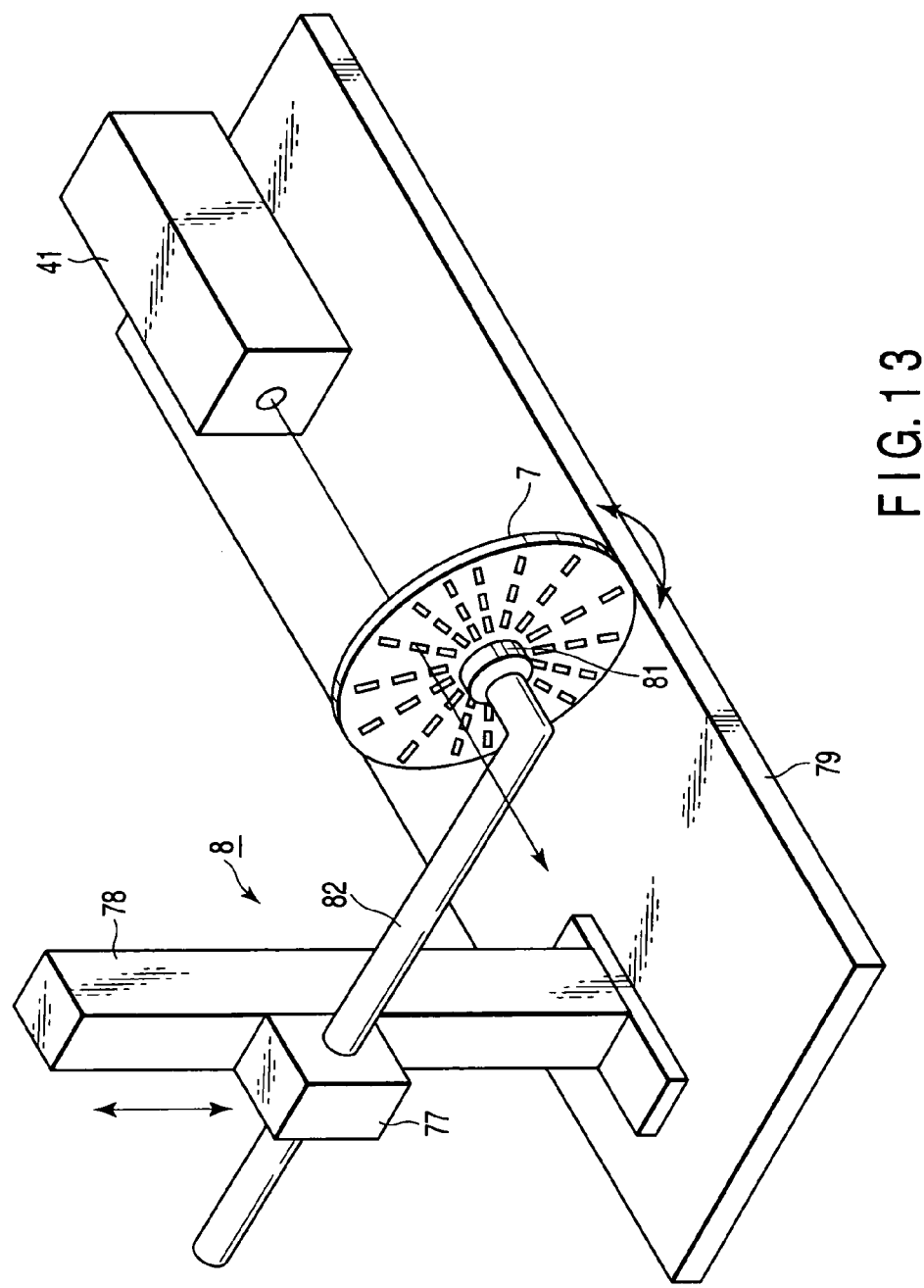
FIG. 13 is a perspective view of a modification of the apparatus according to the first embodiment, illustrating the major components of the modification.

The modified embodiment is characterized in the structures of the support 7 and support-driving mechanism 8. In FIG. 13, the components identical to those of the first embodiment are designated at the same reference numerals as in FIG. 6. As FIG. 13 shows, the support 7 is mounted, cat its center part, on a rotation mechanism 81. The mechanism 81 rotates the support 7 in a plane perpendicular to the laser beam emitted from the laser oscillator 41. A support arm 82, which is an L-shaped member, is connected at distal end to the center part of the rotation mechanism 81. The arm 82 supports the mechanism 81, and the rotation mechanism 81 rotates the support 7. The support arm 82 is supported by the X-axis drive mechanism 77, which is a component of the support-driving mechanism 8. In the modified embodiment, the X-axis drive mechanism 77 is not configured to move the support arm 82 in the X direction (a horizontal direction). The support arm 82 is moved in the Z direction (vertical direction) only, by the Z-axis drive mechanism 78 that supports the X-axis drive mechanism 77.

The support 7 has various types of mask patterns 70 that are identical to those shown in FIGS. 8A to 8G and FIGS. 9A to 9G. The mask patterns are arranged in rows that extend in radial directions of the support 7. Thus, more mask patterns are arranged in a circle than in the adjacent inner circle.

The Z-axis drive mechanism 78 moves the support 7 in the Z direction (vertical direction), and the rotation mechanism 81 rotates the support 7 around the axis of the laser beam. One of the mask patterns 70 is thereby aligned with the axis of the laser beam emitted from the laser oscillator 41. In the modified embodiment, too, the display unit 91 shown in FIG. 10 displays the mask patterns and the operator selects one of the mask patterns displayed. The control unit 9 outputs a control signal to the support-driving mechanism 8 when the operator selects one of the mask patterns. In accordance with the control signal, the mechanism 8 moves the support 7, aligning the selected mask pattern with the axis of the laser beam. The X-axis drive mechanism 77 may be fixed to the Z-axis drive mechanism 78 and may move the support arm 82 in the X direction (a horizontal direction).

Second Embodiment

A laser processing apparatus according to a second embodiment of this invention will be described, with reference to FIGS. 13 to 15, FIGS. 16A and 16B, FIG. 17 and FIGS. 18A and 18B.

Figure 14:
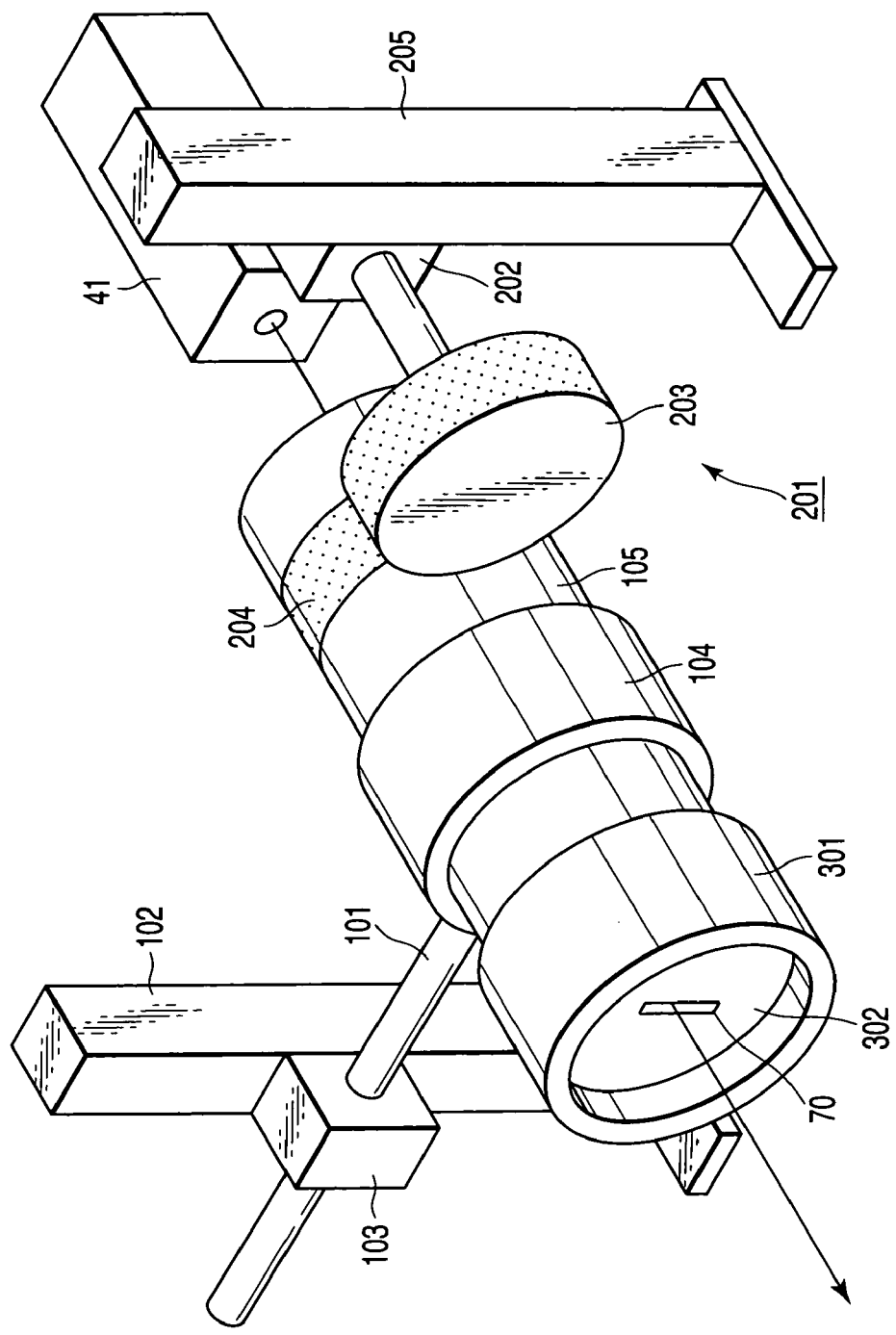
FIG. 14 is a perspective view of an apparatus according to a second embodiment of the present invention.
Figure 15:
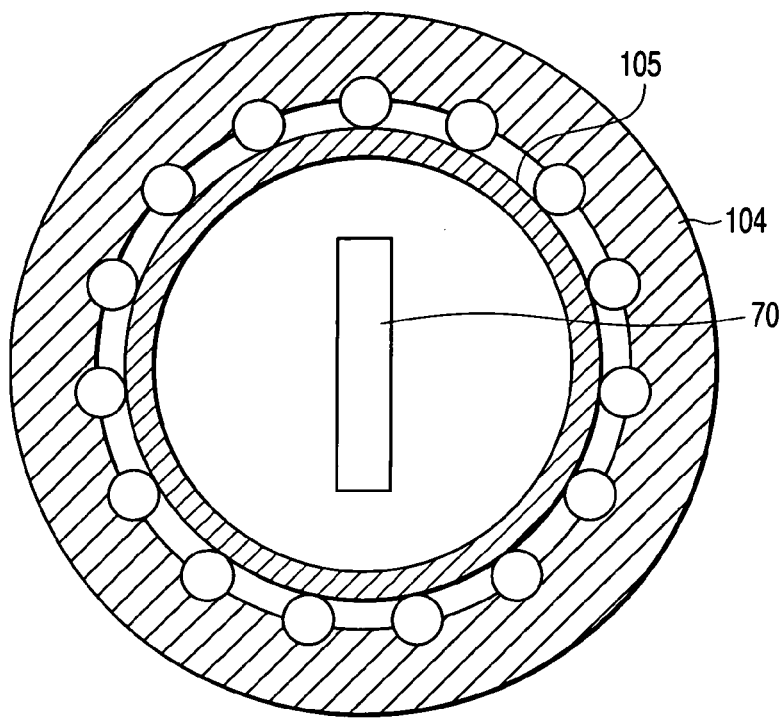
FIG. 15 is a sectional view of an apparatus according to the second embodiment, showing the major components thereof.
Figure 16A:
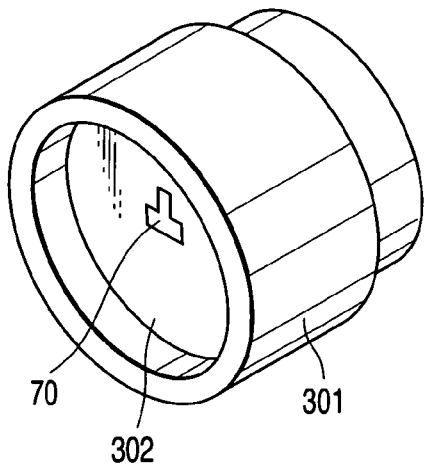
FIGS. 16A and 16B are perspective views, each showing a cap that may be used in the second embodiment.
Figure 16B:
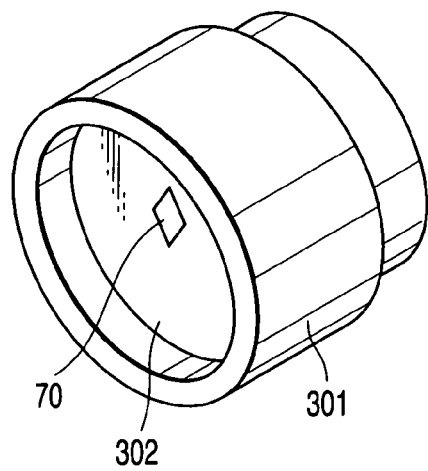

In the second embodiment, the mask patterns are rotated around the axis of the laser beam emitted from the laser oscillator 41. As FIG. 14 shows, a support arm 101 horizontally extends and is secured at proximal end to a lift unit 103 that can move up and down along a support post 102. The support arm 101 is secured to a bearing unit 104. The bearing unit 104 holds a hollow cylinder 105, which horizontally extends and can rotate around its axis. The support arm 101 can be moved with respect to the lift unit 103. Hence, the hollow cylinder 105 can be adjusted in position by moving the support arm 101, so that its center may be aligned with the axis of the laser beam.

The second embodiment has a rotation mechanism 201 that can rotate the hollow cylinder 105 around the axis of the laser beam. The mechanism 201 comprises a driving roller 203 and a driven roller 204, both made of, for example, rubber. The driving roller 203 can be rotated by a drive mechanism 202 that is mounted on a support post 205 and can be adjusted in height. The driven roller 204 is a ring mounted on the outer circumferential surface of the cylinder 105. The rollers 203 and 204 are set in press contact with each other.

A cap 301 is removable mounted on the distal end of the hollow cylinder 105. The cap 301 is a hollow cylinder. A disc 302 is fitted in he cap 105, closing the cap 301. The disc 302 has, for example, a rectangular mask pattern 70, which vertically extends. The mask pattern 70 imparts a specific cross section to the laser beam. The mask pattern 70 is aligned with the axis of the laser beam emitted from the laser oscillator 41. The mask pattern 70 changes in orientation when the driving roller 203 of the rotation mechanism 201 rotates, driving the hollow cylinder 105 around the axis of the laser beam. Caps other than the cap 301 are provided. These caps have such different mask patterns as shown in, for example, FIGS. 16A and 16B, respectively. The cap 301 may be replaced by one of these caps, whereby the mask pattern is changed from one to another.

Figure 17:
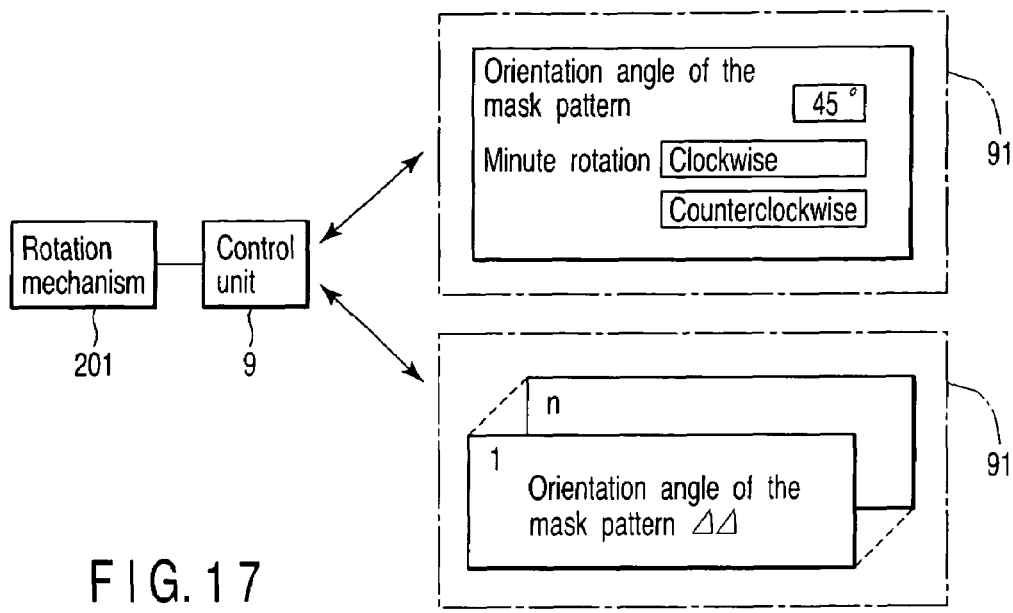
FIG. 17 is a block diagram schematically representing a controller and showing images that a display unit may display in the apparatus according to the second embodiment.

In the second embodiment, too, the control unit 9 controls the rotation mechanism 201 shown in FIG. 17. The operator can set an angle by which the mask pattern 70 should be rotated or orientated, on the display unit 91. The operator can selects a desired orientation for the mask pattern in two modes as in the first embodiment. In the first mode, the operator selects one of the various mask-pattern orientations shown in the lower menu 91 displayed on the display unit 9. (The orientations shown in the lower menu are defined by angles to the vertical line.) Then, the control unit 9 outputs a control signal to the support-driving mechanism 8. In the second mode, the operator selects one of the various orientation angles shown in the upper menu 91 displayed on the display unit 9. Then, the rotation mechanism 201 rotates the hollow cylinder 105 by the angle selected. The mask pattern 70 is thereby rotated by the angle. In either mode, the operator may repeatedly click the clockwise button or the counterclockwise button displayed in the menu 91, thus minutely adjusting the orientation of the pattern mask 70 by the angle that is proportional to the number of times the operator has clicked the button.

Figure 18A:
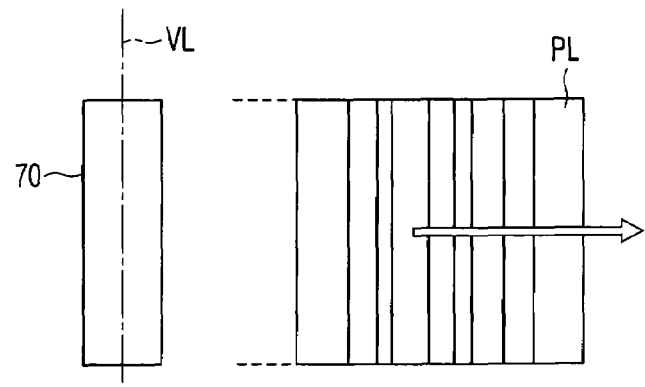
FIGS. 18A and 18B are diagrams schematically showing the cross-sectional shapes that a laser beam may have, which is applied to a substrate to form a dicing line in a surface of the substrate, in another laser processing method according to this invention.
Figure 18B:
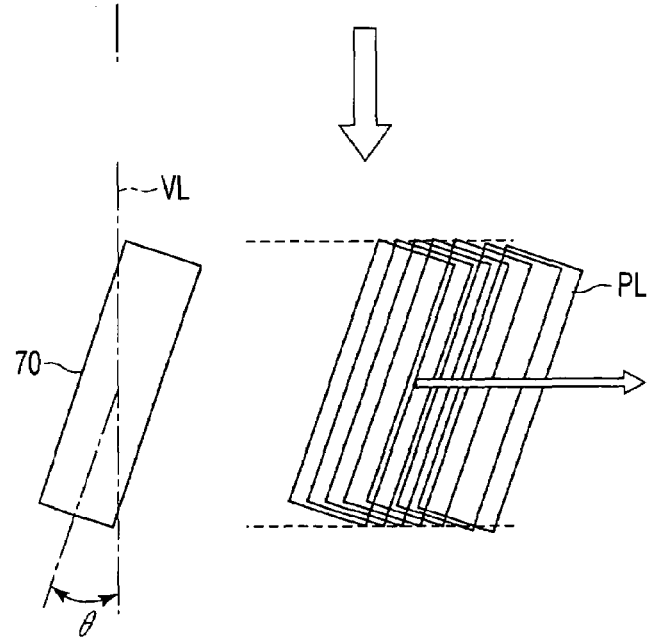

FIGS. 18A and 18B show how the width of a groove to be cut in the surface of a wafer W is changed by inclining the mask pattern 70. FIG. 18A depicts how pulse laser beams PL are sequentially applied to the wafer W when the axis of the mask pattern 70 is aligned with the vertical line VL. FIG. 18B shows how pulse laser beams PL are sequentially applied to the wafer W when the axis of the mask pattern 70 is inclined by angle θ to the vertical line VL.

With the second embodiment, it is possible to adjust the orientation of the mask pattern 70 easily, thereby changing the width of the laser beam easily. That is, the width of the laser beam can be easily set to an appropriate value corresponds to the width of the groove to be made in, for example, a thin film provided on the wafer W. Instead, a desirable mask pattern 70 may be selected and then adjusted in orientation, thereby to accomplish a minute adjustment on the laser process. As a result, the laser processing method can be carried out in as good a manner as desired. Moreover, the operator needs only to select one of the laser processes that the apparatus can perform, or to input an orientation angle for the mask pattern selected. Then, the support 7 is automatically rotated to incline the mask pattern by that angle. This saves labor on the part of the operator. In view of this, the laser-process apparatus is very useful.

According to the present invention, the support having various types of mask patterns is moved, thereby to align any one of the mask patterns with the axis of the laser beam. This renders it easily to adjust the laser beam minutely in terms of cross-sectional shape. That is, it is easy to impart a desired cross-sectional shape to the laser beam. The laser-process apparatus can therefore be versatile for use in various kinds of laser processes.

Once the operator selects one of the mask patterns displayed on the display unit, the mask pattern selected is automatically aligned with the axis of the laser beam. Namely, it is very extremely easy to set the mask pattern in position.

Furthermore, when the operator selects one of various laser processes, the mask pattern optimal for the process selected is automatically selected and aligned with the axis of the laser beam. The operator makes no errors in setting a desired mask pattern, even if he or she is not skilled in the work.

Moreover, if the support has a mask pattern that is aligned with the axis of the laser bean and can be rotated around the axis of the laser beam, the width of the laser beam applied to the wafer W can be easily changed. (This change results in the same advantage as the change in the cross-sectional shape of the laser beam.) Thus, the laser beam can easily acquire an appropriate width that corresponds to the width of the groove to be made in, for example, a thin film provided on a substrate. To remove a part of a film from a substrate by moving the beam spot in the manner of one-stroke picture drawing, it is easy to select a width appropriate for the laser beam, in accordance with the size and shape of that part of the film. In this case, an orientation appropriate for the mask pattern may be set on the display screen, or a laser processing method to be performed may be selected on the display screen. Then, the support is automatically rotated to orientate the mask pattern. This saves much labor on the part of the operator.

What is claimed is:

1. A laser processing apparatus which processes a substrate by supplying liquid onto a surface of the substrate and irradiating the substrate covered with the liquid with a laser beam, the apparatus comprising:
   a laser source unit which emits a laser beam;
   a substrate-holding unit which holds a substrate;
   a liquid-supplying unit which supplies liquid to a surface of the substrate;
   a support which is arranged between the laser source unit and the substrate-holding unit and which has a plurality of mask patterns including a specific mask pattern for imparting a cross-sectional shape to the laser beam;
   a support-driving mechanism which moves the support;
   a control unit which controls the support-driving mechanism, storing correlation data representing a relation between types of laser processes and types of mask patterns; and pattern-selecting means which selects one type of a laser process and selects a mask pattern corresponding to the selected type of laser process from the plurality of types of mask patterns based on the correlation data, wherein the liquid-supplying unit supplies the liquid to the surface of the substrate held by the substrate-holding member, the pattern-selecting means selects the one mask pattern, the support-driving mechanism moves the support, aligning the selected mask pattern with an axis of the laser beam, and the laser beam emitted from the laser source unit passes through the selected mask pattern, acquiring a specific cross-sectional shape, and is applied to the surface of the substrate through the film of liquid, illuminating a surface region of the substrate.

2. The apparatus according to claim 1, wherein the support is a plate having mask patterns of various types formed by etching.

3. The apparatus according to claim 2, wherein the support-driving mechanism moves the support in an X direction and a Z direction.

4. The apparatus according to claim 2, wherein the support-driving mechanism moves the support in at least one of the X and Z directions and rotates the support in an X-Z plane that is at right angles to the axis of the laser beam.

5. The apparatus according to claim 1, wherein the support-driving mechanism moves the support in an X direction and a Z direction.

6. The apparatus according to claim 1, wherein the support-driving mechanism moves the support in at least one of the X and Z directions and rotates the support in an X-Z plane that is at right angles to the axis of the laser beam.

7. The apparatus according to claim 1, wherein the pattern-selecting means has a display unit which displays said plurality of mask patterns including the selected mask pattern.

8. The apparatus according to claim 7, wherein the control unit stores correlation data representing a relation between types of laser processes and types of mask patterns, and the pattern-selecting means selects one type of a laser processing method and selects the mask pattern corresponding to the selected type of a laser process.

9. A laser processing apparatus designed to supply liquid to a surface of a substrate held on a substrate-bolding unit, forming a film of liquid, wherein a laser beam emitted from a laser source unit is guided through a mask pattern, thus acquiring a specific cross-sectional shape, and the laser beam is applied to the surface of the substrate through the film of liquid, thus scanning a selected region of the substrate with the laser beam, the laser processing apparatus comprising:
 a laser source unit;
 a support which supports the mask pattern in alignment with an axis of the laser beam from the laser source unit and which can be rotated around the axis of the laser beam;
 a rotation mechanism which rotates the support;
 an angle-setting mechanism which sets an angle of orientation for the mask pattern;
 a control unit which controls the rotation mechanism to make the angle of orientation of the mask pattern as set by the angle-setting mechanism, storing correlation data representing a relation between types of laser processes and types of mask patterns; and
 pattern-selecting means which selects one type of a laser process and selects a mask pattern corresponding to the selected type of laser process from the plurality of types of mask patterns based on the correlation data.

10. A laser processing method designed to supply liquid to a surface of a substrate held on a substrate-holding unit, forming a film of liquid, wherein a laser beam emitted from a laser source unit is guided through a mask pattern, thus acquiring a specific cross-sectional shape, and the laser beam is applied to the surface of the substrate through the film of liquid, thus scanning a selected region of the substrate with the laser beam, said process comprising the steps of:
 (a) holding the substrate on the substrate-holding unit;
 (b) supplying the liquid to the surface of the substrate held on the substrate-holding unit, forming a film of liquid on the surface of the substrate;
 (c) selecting a specific one of mask patterns which define various cross-sectional shapes for the laser beam in accordance with correlation data representing a relation between types of laser processes and types of mask patterns, the specific one of the mask patterns corresponding to a type of a laser process;
 (d) moving a support having the mask patterns, aligning the specific mask pattern with an axis of the laser beam; and
 (e) emitting the laser beam from the laser source unit such as to emit it through the specific mask pattern, imparting a specific cross-sectional shape to the laser beam, then applying the laser beam to the surface of the substrate through the film of liquid, illuminating a surface region of the substrate.

11. The method according to claim 10, wherein, in the step (d), the support is moved in an X direction and a Z direction.

12. The method according to claim 10, wherein, in the step (d), the support is moved in at least one of an X and a Z directions and is rotated in an X-Z plane that is at right angles to the axis of the laser beam.

13. A laser processing method designed to supply liquid to a surface of a substrate held on a substrate-holding unit, forming a film of liquid, wherein a laser beam emitted from a laser source unit is guided through a mask pattern, thus acquiring a specific cross-sectional shape, and the laser beam is applied to the surface of the substrate through the film of liquid, thus scanning a selected region of the substrate with the laser beam, said process comprising the steps of:
 (i) holding the substrate on the substrate-holding unit;
 (ii) supplying the liquid to the surface of the substrate held on the substrate-holding unit, forming a film of liquid on the surface of the substrate;
 (iii) setting an angle of orientation for a mask pattern which defines a cross-sectional shape for the laser beam while selecting a specific one of the mask patterns which define various cross-sectional shapes for the laser beam in accordance with correlation data representing a relation between types of laser processes and types of mask patterns, the specific one of the mask patterns corresponding to a type of a laser process;
 (iv) rotating a support having the mask pattern, around an axis of the laser beam by the angle of orientation set; and
 (v) emitting the laser beam through the mask pattern the angle of orientation of which is set, imparting a cross-sectional shape to the laser beam, then applying the laser beam to the surface of the substrate through the film of liquid, illuminating a surface region of the substrate.

* * * * *